United States Patent [19]

Yokoo

[11] Patent Number: 4,611,251
[45] Date of Patent: Sep. 9, 1986

[54] TRANSMISSION CHANGE-OVER MECHANISM FOR SELECTIVELY DRIVING AUTOMATIC-LOADING AND TAPE-OPERATION MEANS IN A MAGNETIC RECORDING AND REPRODUCING APPARATUS

[75] Inventor: Shouzou Yokoo, Yokohama, Japan
[73] Assignee: Hitachi, Ltd., Tokyo, Japan
[21] Appl. No.: 536,873
[22] Filed: Sep. 29, 1983
[30] Foreign Application Priority Data Oct. 1, 1982 [JP] Japan .................................. 57-170988

[51] Int. Cl.$^4$ .......................... G11B 5/08; G11B 15/00
[52] U.S. Cl. .......................................... 360/85; 360/95
[58] Field of Search .................. 360/85, 95, 93, 130.22

[56] References Cited
U.S. PATENT DOCUMENTS

| | | | |
|---|---|---|---|
| 3,825,944 | 7/1974 | Terao et al. ............................ | 360/85 |
| 3,979,772 | 9/1976 | Umeda .................................. | 360/85 |
| 4,138,699 | 2/1979 | Ura et al. .............................. | 360/85 |
| 4,309,731 | 1/1982 | Yoshida et al. ....................... | 360/85 |
| 4,408,236 | 10/1983 | Murata et al. ........................ | 360/85 |
| 4,562,496 | 12/1985 | Saito et al. ............................ | 360/85 |

Primary Examiner—Stuart N. Hecker
Assistant Examiner—Benjamin E. Urcia
Attorney, Agent, or Firm—Antonelli, Terry & Wands

[57] ABSTRACT

A magnetic recording and reproducing apparatus such as a video tape recorder has a first gear mechanism, a second gear mechanism, an operation cam rotable by power of the first gear mechanism, tape operation driving mechanisms actuated by the operation cam, a tape loading mechanism driven by the power of the second gear mechanism, and a driving power transmission change-over mechanism for transmitting the torque of a motor selectively to the first and second gear mechanisms.

4 Claims, 14 Drawing Figures

TRANSMISSION CHANGE-OVER MECHANISM FOR SELECTIVELY DRIVING AUTOMATIC-LOADING AND TAPE-OPERATION MEANS IN A MAGNETIC RECORDING AND REPRODUCING APPARATUS

BACKGROUND OF THE INVENTION

1. Field of the Invention

The present invention relates to a magnetic recording and reproducing apparatus having mechanisms such as a tape loading mechanism adapted for extracting a magnetic tape from a cassette and setting the tape over a predetermined angular range up around a rotary head cylinder, a pinch roller pressing mechanism adapted for pressing a pinch roller to a capstan through the magnetic tape, and so forth.

2. Description of the Prior Art

In a known apparatus of the kind specified above, particularly a video tape recorder, the loading mechanism is operated either in loading mode or in unloading mode by the power of a loading motor which is used also for driving the pinch roller pressing mechanism. In other words, the output power of the loading motor is transmitted not only to the loading mechanism but also to the tape operating mechanisms such as the pinch roller pressing mechanism, braking mechanism, tension arm mechanism and so forth corresponding to various tape operation modes such as forwarding, rewinding, recording, playback or reproduction, still, search and so on, so that these mechanisms are driven commonly by a single motor. According to this arrangement, it is possible to simplify the construction of the apparatus as a whole.

FIGS. 1 to 4 show the mechanism of an example of a conventional video tape recorder. FIG. 1 shows the mechanism in still position, while FIG. 3 shows the same in the playback or reproducing mode. In operation, when a reproducing or playback button 5 is depressed while the apparatus is out of operation (still) as shown in FIG. 1, a slider 59 slides to the right along the base 1 so that the arm 60 is rotated counter-clockwise around a fulcrum constituted by a shaft 60a. The counter-clockwise rotation of the arm 60 causes an arm 61 to rotate clockwise around a fulcrum presented by a pin 61a so that a slider 62 is slid upwardly through the action of a pin 61b. A projection 62c of the slider 62 pushes a switch lever 67' to rotate the same clockwise around a fulcrum constituted by a shaft 73. At the same time, a switch lever 67 is rotated clockwise around a fulcrum constituted by the shaft 73 by the biasing force of the spring 68 with the tapered portion 67a slid in contact with a projection 62e of the slider 62. As a result, the switch lever 67 presses the actuator 64a of a switch 64, while the switch lever 67' releases the actuator of a switch 65. Consequently, the switch 65 is turned off while the switch 64 is turned on so that a motor 29 is energized to rotate its shaft counter-clockwise. The output torque of the motor 29 is transmitted through a belt 32 to a pulley 31 to rotate the same in counter-clockwise direction. Consequently, a worm 33 coaxially mounted on the pulley 31 is rotated to cause a clockwise rotation of a worm wheel 34 about the axis of a shaft 34b as well as a counter-clockwise rotation of a worm wheel 34' about the axis of a shaft 34b'. The rotation of the worm wheels 34 and 34' drive links 36 to 38 and 36' to 38' which are connected through pins 34a and 34a' to one ends of springs 35 and 35' provided in guide grooves 34d and 34d' in these worm wheels 34 and 34'. Consequently, pins 39 and 39', which are provided on the other ends of the links 38 and 38', start their movements along U-shaped grooves 40a and 40a' formed in guiding members 40 and 40'. As a result of the movements of the pins 39 and 39', posts 26 and 26' mounted on guide securing members 24 and 24' and cylindrical guiding bodies 27 and 27' catch a magnetic tape 42 in a cassette 54 at two portions of the tape 42 and extract the tape 42 out of the cassette 54 and start movements along grooves 11a and 11b formed in a guide base 11. As the guiding bodies 27 and 27' move, a tension arm 78 is allowed to rotate counter-clockwise around a fulcrum constituted by a shaft 78a by the force of a spring 75 and, as a result of movements of the guide securing members 24 and 24', it is rotated to the position shown in FIG. 4 to limit the path along which the magnetic tape 42 runs. On the other hand, a web-like member 76 exerts a braking force necessary in the recording and reproducing operations to the feeding reel base 10.

As a result of this series of operations, the mechanisms come to take the positions shown in FIGS. 3 and 4. The positions of the posts 27 and 27' on the guide mounting members 24 and 24' are limited due to contact of these posts 27 and 27' with retainer members 41 and 41'. In this state, the magnetic tape 42 runs past the tape guide pins 13, 74 and 14 to make contact with an eraser head 15 and a roller 16 and further to the rotary head cylinder 12 past a cylindrical guiding piece 27 and a correction post 26 and is wound around the rotary cylinder head 12 over a predetermined angle. The tape further runs past a correction post 26' and a cylindrical guiding member 27' and, after making contact with a roller 17 and an audio control head 18, runs into the cassette 54 past a tape guide pin 19 and a capstan 21. Then, the shaft of the motor 29 is further rotated to stretch the springs 35 and 35' in gears 34 and 34' so that the springs 35 and 35' exert a force to press the posts 27 and 27' on the guide securing member 24 and 24' strongly against the retainer members 41 and 41'.

On the other hand, the rotation of the worm wheel 34' brings the pin 34c' on the worm wheel 34' into contact with a loading arm 44 thereby to rotate this arm as shown in FIG. 3. As the arm 44 is rotated clockwise, an arm 45 is pulled out overcoming the force of the spring 53 so that a pinch roller arm 23 is rotated counter-clockwise with respect to the shaft 23a thereby to bring the pinch roller 22 into contact with the capstan 21. Then, as the worm wheel 34' is rotated to move the arm 45 ahead, the arm 50 is rotated clockwise with respect to the shaft 50a so that a spring 51 is slightly tensioned to press the pinch roller 22 onto the capstan 21 with the magnetic tape 42 pinched therebetween.

Referring to FIG. 3, as the pinch roller arm 23 is rotated counter-clockwise, the arm 70 is driven by a pin 23b to rotate clockwise around a fulcrum constituted by a shaft 70a out of engagement with a pin 71a, so that a take-up roller 79 is biased by a spring 72 towards a take-up reel base 9 into driving contact with the same. Meanwhile, the loading arm 44 presses at a portion thereof a projecting piece 67b of the switch lever 67 while rotating the other switch lever 67' counter-clockwise around the fulcrum of the shaft 73, so that the actuator 64a of the switch 64 is released from the pressing force to turn the switch 64 off thereby to stop the power supply to the motor 29. However, due to inertia of the driving system including the rotor of the motor, the worm wheels 34 and 34' are further rotated slightly even after the stop of power supply to the motor 29. This rotation or over-run is limited by the contact of the pin 34c on the worm wheel 34 (see FIG. 3) with the left side 11e of a downward bend 11c of the guide base 11. In addition, since the speed reduction system constituted by the worm 33 and the worm wheels 34 and 34' has a large reduction ratio, the driving system is not reversed even after the motor 29 is stopped by the turning-off of the switch 64 by the loading arm 44, so that the apparatus is held in the recording or playback condition shown in FIGS. 3 and 4.

Thus, in the conventional apparatus, both of the loading mechanism and the operation mechanisms are actuated within a predetermined rotational stroke (maximum 360°) of the worm wheels 34 and 34'. Namely, both of the loading mechanism and the operation mechanisms are driven within a predetermined rotational stroke and the worm wheels 34 and 34' continue to rotate even during loading. Therefore, a considerably large part $\theta_1$ of the rotational driving stroke of the worm wheels is used for the driving of the loading mechanism and only a small part $\theta_2$ of the rotational stroke is available for the driving of the operation mechanism. More specifically, assuming that the maximum angle of rotation of the worm wheels is 360°, there is a relationship expressed by:

$$\theta_2 = 360° - \theta_1, \theta_2 < \theta_1$$

Thus, since various operation mechanisms such as the braking mechanism, pinch roller mechanism and so forth have to be driven within a small angular range $\theta_2$, it is necessary to increase the precision of the mechanisms because it would otherwise be difficult to have an accurate and reliable change-over from one mode to another.

SUMMARY OF THE INVENTION

Accordingly, it is an object of the invention to provide a magnetic recording and reproducing apparatus capable of reliably driving the tape operation mechanisms without requiring any increased precision of the tape operation mechanisms and the precision of the driving system for such operation mechanisms.

To this end, according to the invention, the driving power produced by a loading motor is selectively transmitted to the loading mechanism and the tape operation mechanisms through a power transmission change-over mechanism.

The above and other objects, features and advantages of the invention will become clear from the following description of a preferred embodiment of the invention made with reference to the accompanying drawings.

DESCRIPTION OF THE PREFERRED EMBODIMENT

Figure 1:
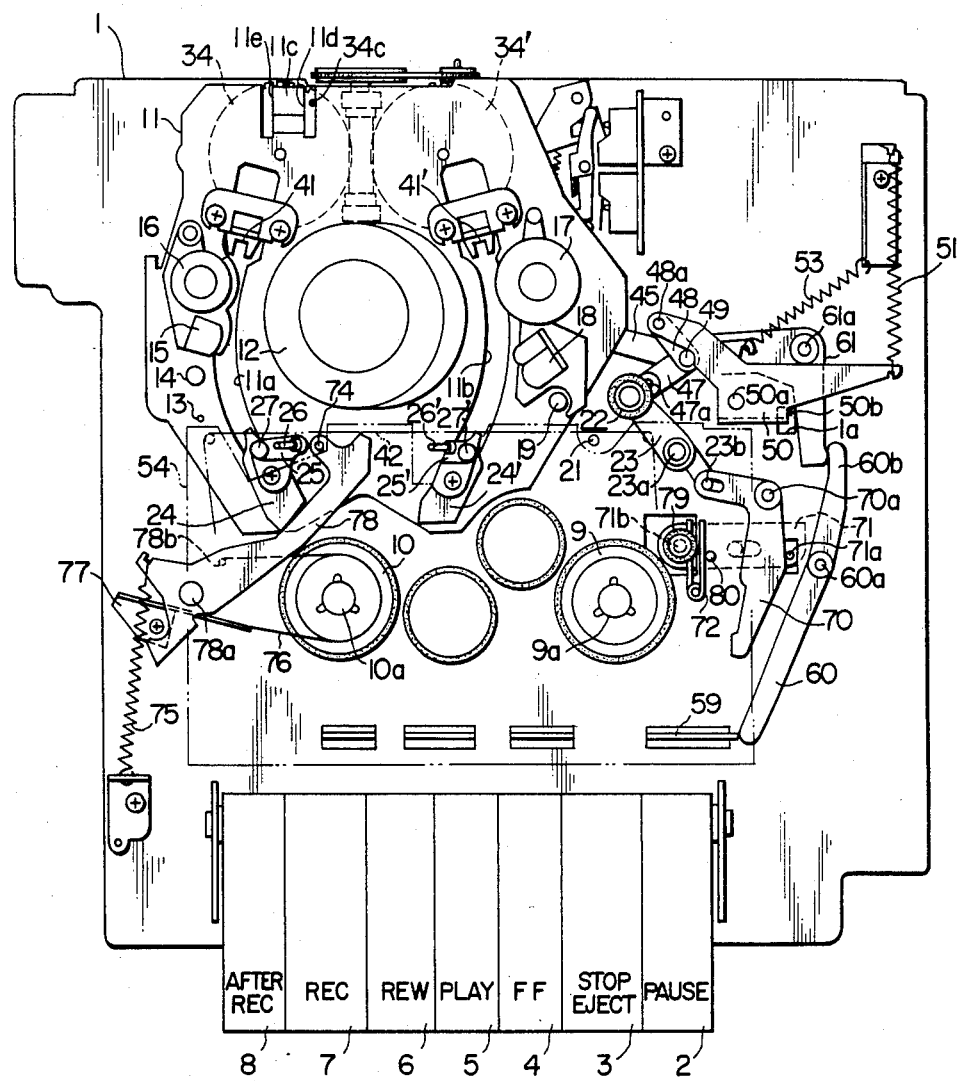
FIG. 1 is a plan view of a conventional magnetic recording and reproducing apparatus.
Figure 2:
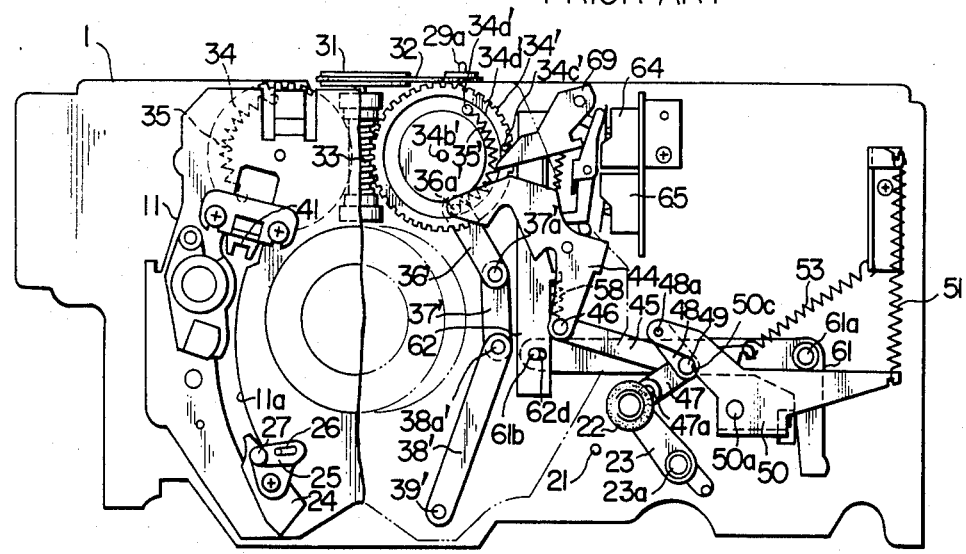
FIG. 2 is a plan view of the conventional apparatus shown in FIG. 4 with a half part of a base adjacent to a push button and a right half part of the guide base omitted.
Figure 4:
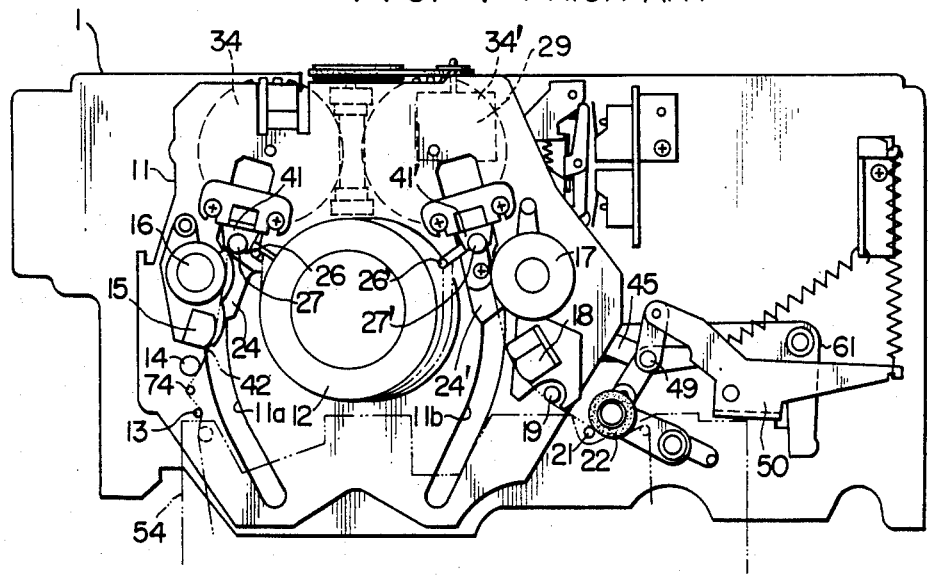
FIG. 4 is a plan view of a part of the apparatus in its recording or reproducing operation mode.
Figure 3:
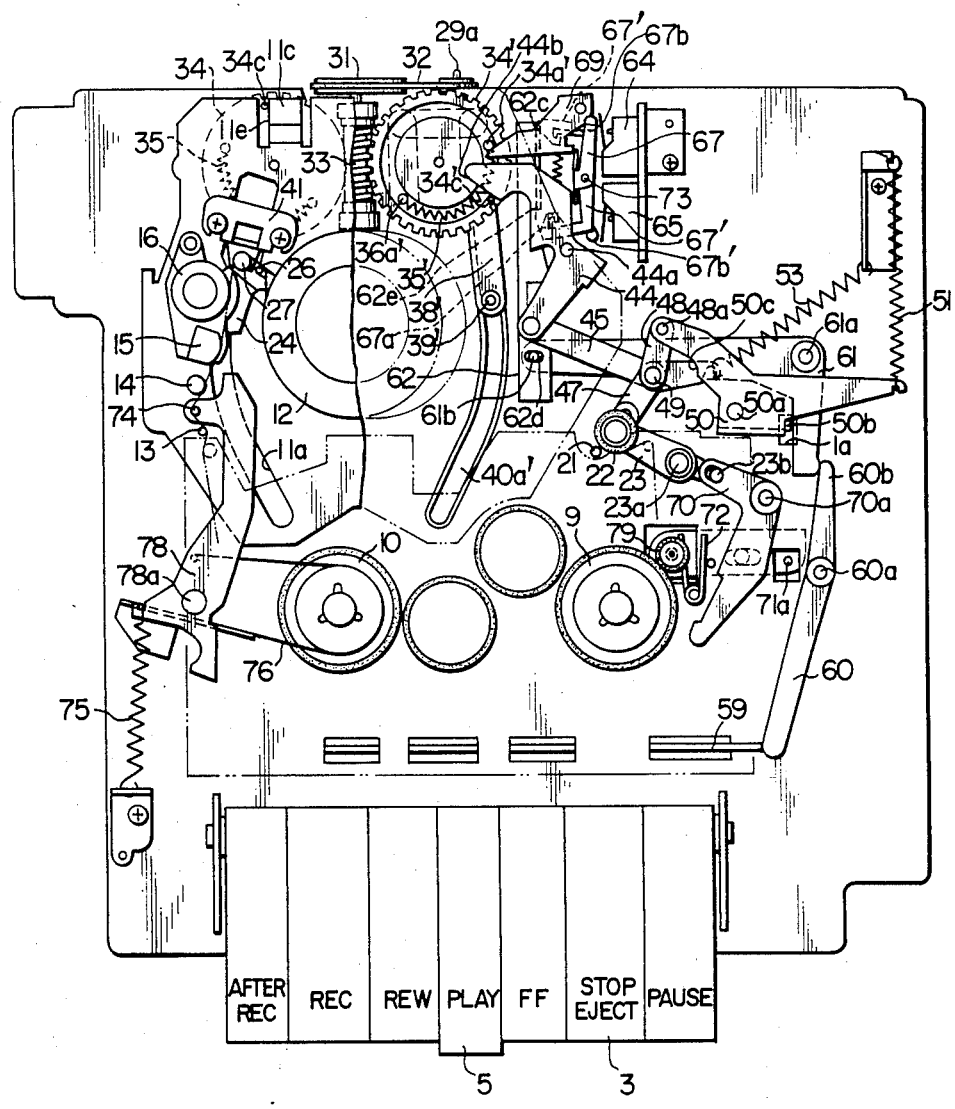
FIG. 3 is a plan view of the apparatus in its recording or reproducing operation mode with the right half part of the guide base omitted.
Figure 5:
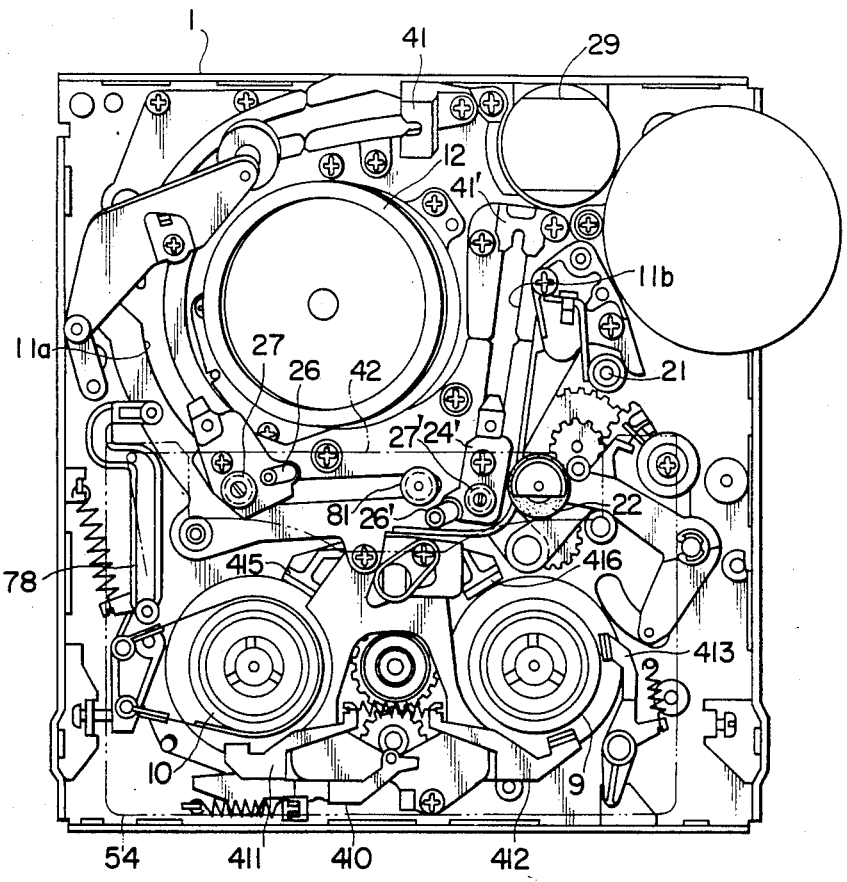
FIGS. 5, 12 and 13 are plan views of an essential part of a recording and reproducing apparatus of the invention in respective major operation modes.
Figure 7:
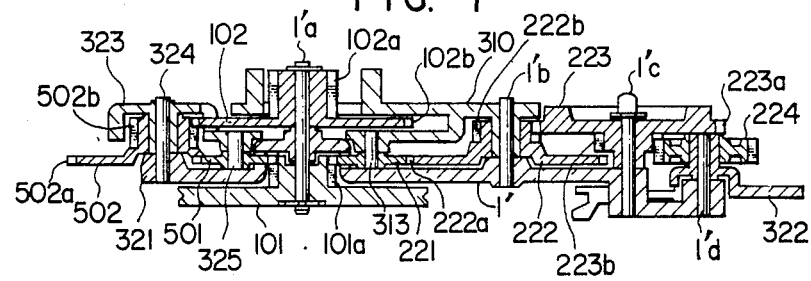
FIG. 7 is a sectional view of an essential part of a gear mechanism incorporated in the driving system.

An embodiment of the invention will be fully described hereinunder with reference to the accompanying drawings. FIG. 5 is a plan view of an embodiment of the magnetic recording and reproducing apparatus of the invention, while FIG. 6 and FIGS. 8 to 11 are plan views of a driving system for driving a loading mechanism and tape operation mechanisms. FIG. 7 is a sectional view of an essential part of a gear mechanism incorporated in the driving system.

Referring to these drawings, a loading motor 29 is adapted to be started automatically by, for example, sensing the cassette 54 mounted on a preselected position of the magnetic recording and reproducing apparatus. A driving mechanism 100 is connected through a belt 32 to the motor 29. The driving mechanism 100 has a pulley 101 and a driving gear 102 which are adapted to be rotated by the power derived from the motor 29. As will be seen in FIG. 7, the pulley 101 is rotatably supported by the lower end portion of a shaft 1'a which is fixed to a sub-base plate 1', while the driving gear 102 is rotatably supported by the upper end portion of the same shaft 1'a. The sub-base plate 1' is fixed to the reverse side of a main base plate 1.

A tape operation mechanism driving means generally designated by numeral 200 is adapted to drive tape operation mechanisms 400 which includes a braking mechanism 410, a pinch roller pressing mechanism 420 and so forth. The tape operation mechanism driving means 200 is composed of an operation cam means 210 for directly driving the tape operation mechanism 400 and a cam actuating means 220 for actuating the operation cam means 210. The cam actuating means 220 has a plurality of cam actuating gears 221 to 224. More specifically, reference numeral 221 denotes an idler gear which is rotatably fixed to the shaft 313 of a rotary lever means (cam gear control lever means) 310 of a driving power transmission change-over means 300 which will be discussed later. Another gear 222 is rotatably supported by a shaft 1'b on the sub-base plate 1' together with the cam gear control lever means 310. Other gears 223 and 224 are rotatably supported by shafts 1'c and 1'd on the sub-base plate 1'. The cam gear control lever means 310 is formed by an inversed J-shaped lever 311 and an L-shaped lever 312 which are constructed as a unit with each other. More specifically, the lever 311 carries a control pin 314 which is received by an arcuate guide groove 603 formed in a loading ring 601 which will be discussed later, while the lever 312 supports the idler gear 221. The operation cam means 210 includes a cam wheel 211 rotatably mounted on a shaft 215 and provided with a gear portion 211a in meshing engagement with the gear 224. A cam surface constituting a loading gear control cam 212 is formed on the lower side of the cam wheel 211. The loading gear control cam 212 opposes and contacts with a projection 322a of a movable lever (winding gear control lever) 322 of a movable lever means (loading gear control lever means) 320 of the driving power transmission change-over means 300. A recess 212a is formed in the surface of the cam 212 opposing and contacting with the lever 322. As will be seen in FIG. 6, cam grooves 213 and 214 are formed in the upper surface of the cam wheel 211. The cam groove 213 is so shaped that a pinch roller pressing mechanism 420 takes any one of a number of operation modes, such as recording and playback, forwarding, pause and so forth, while the cam groove 214 is shaped to permit the braking mechanism 410 to have the same mode.

A pin 421a fixed to one end of the cam lever 421 of a pinch roller pressing mechanism 420 engages with the cam groove 213 in the cam wheel 211. The cam lever 421 is rotatably supported at its one end by a shaft 421b while the other end of the cam lever 421 is connected to one end of a slider 422 through a pin 421c. The slider 422 is supported by guide pins 422a and 422b for sliding motion in the left and right directions. A lever 423 is rotatably supported by a shaft 423a on a lever 425 which in turn is rotatably supported by a shaft 425a on the base plate 1. The lever 423 is in engagement at its one end with a pin 422c formed on the other end of the slider 422 and is biased in counter-clockwise direction by a spring 424. A reference numeral 427 designates a pinch roller arm carrying at its one end the pinch roller 22. The pinch roller arm 427 is rotatably supported by a shaft 427a and is operatively connected to the lever 423 through a link 426.

On the other hand, a pin 414a fixed to one end of the cam lever 414 of the braking mechanism 410 is held in engagement with the cam groove 214 in the cam wheel 211. Although not shown, a suitable operative connection means is provided to operatively connect the cam lever 414 to a T brake 413, main brakes 415 and 416 and sub-brakes 411 and 412 shown in FIG. 5, so that these brakes are put into effect by the operation of the cam lever 414.

In the described embodiment, the cam grooves 213 and 214 for driving the braking mechanism and the pinch roller pressing mechanism are formed in the cam wheel 211. The cam wheel, however, may be provided with other cam grooves for controlling other operation mechanisms.

The loading mechanism generally designated at numeral 600 is adapted to be driven by a driving means generally designated at a numeral 500. This means is composed of a plurality of loading driving gears 501 and 502 and so forth. More specifically, the gear 501 is an idler gear which is rotatably supported by a shaft 325 fixed to the movable lever (loading gear control lever) 321, so that the gear 501 is moved in response to the movement of the lever 321. The gear 502 is rotatably supported by the shaft 324 together with the loading control lever 323. The gear 502 is always held in meshing engagement with the idler gear 501 which is brought into engagement with a gear portion 102b of the pulley 102 in response to the movement of the lever 321. The loading gear control levers 322 and 323 are movably connected to each other through the movable lever (loading gear control lever) 321 which is biased by a spring 326 in the direction of an arrow A shown in FIG. 6.

As is well known, the loading mechanism 600 is adapted to pull the magnetic tape 42 out of the cassette 54 and wind the same up around the rotary head cylinder 12 over a predetermined angular range. The head 12 contains rotary heads. A reference numeral 601 designates a loading ring incorporated in the loading mechanism 600. The loading ring 601 is provided with a gear portion 602 which meshes with the afore-mentioned gear portion 102a of the gear 102 in the driving mechanism 100. The guiding groove 603 in the ring 601 has its opposite ends 603a and 603c offset inwardly from the central portion 603b thereof. Slant grooves 603d and 603e are formed, respectively, between the end portion 603a and the central portion 603b and between the central portion 603b and the end portion 603c in order to permit a smooth movement of the control pin 314 along the guiding groove 603.

Tape extraction members 24 and 24' and a tape guide 81 are disposed on the upper portion of the ring 601. The tape extraction member 24' is also driven by the rotation of the ring 601 through a gear and an arm engaging the ring 601. The tape extraction members 24 and 24' and the tape guiding member 81 are driven by the rotation of the ring 601 so as to slide along the guide grooves 11a and 11b formed in the base plate 1.

As described before, the control pin 314 on the cam gear control lever means 310 is received by the guide groove 603 in the loading ring 601 so that the operation of the means 310 is limited by the rotation of the loading ring 601. More specifically, when the loading ring 601 is in the position shown in FIG. 8, i.e., when the control pin 314 is in the guide groove 603a and 603c in the ring 601, the idler gear 501 is brought into engagement with the gear 101a by a clockwise rotation of the lever means 310. On the other hand, when the control pin 314 is in the central guiding groove 603b in the ring 601 as shown in FIG. 9, the idler gear 501 is disengaged from the gear 101a by a counter-clockwise rotation of the lever means 310.

An explanation will be made hereunder with respect to the operation of each mechanism.

Figure 6:
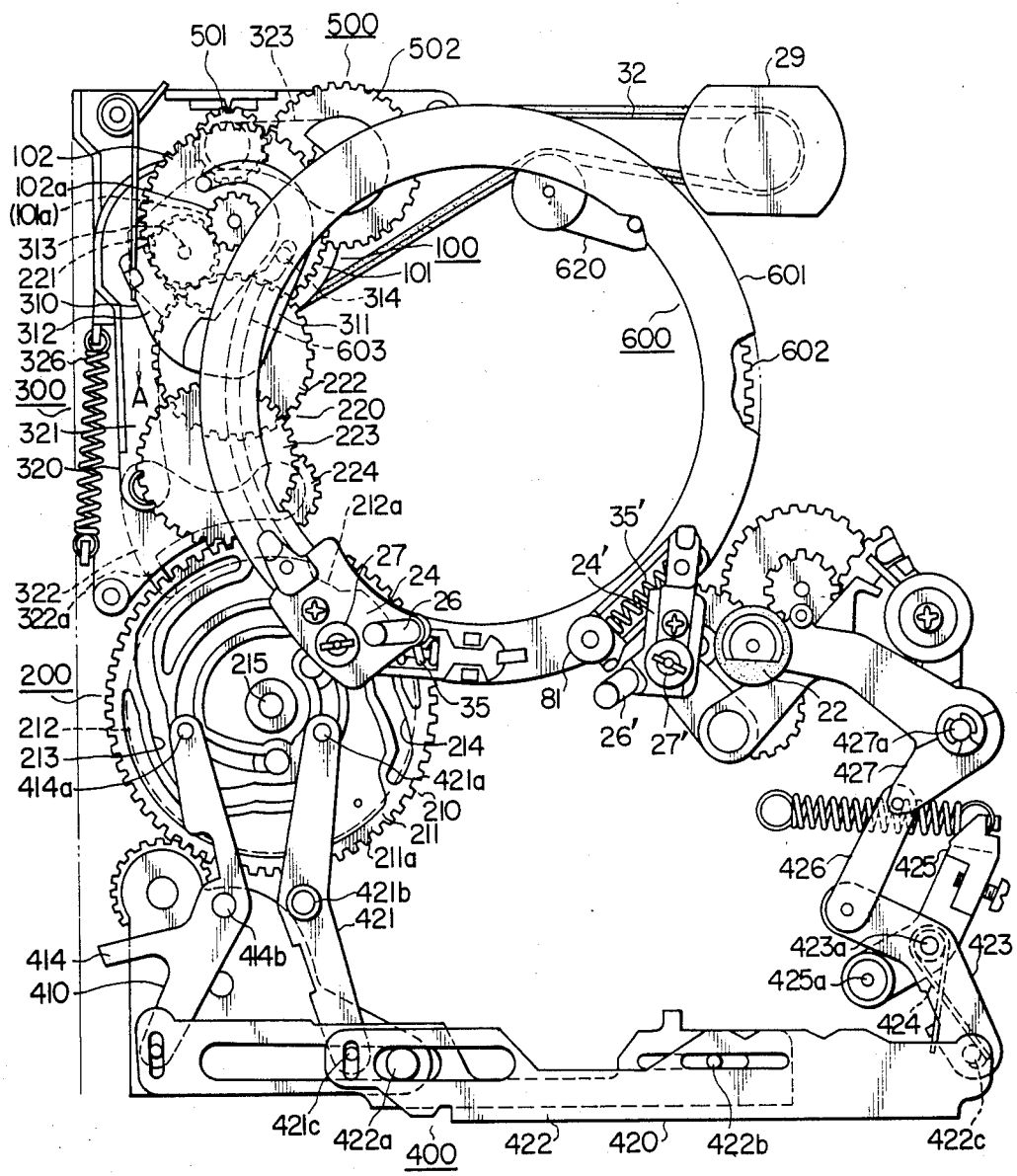
FIGS. 6 and 8 to 11 are schematic plan views of an essential part of the driving system in accordance with the invention.

It is assumed that the apparatus is in its still position as shown in FIGS. 5 and 6. The motor 29 is automatically started when the cassette 54 is mounted on the preselected position. This can be achieved by sensing the presence of the cassette by, for example, a microswitch and starting the power supply to the motor 29 when the cassette is sensed by the microswitch. When the motor 29 is energized as a result of the mounting of the cassette 54, the shaft of the motor 29 starts rotation in the clockwise direction and the torque of the motor is transmitted to the pulley 101 through the belt 32 thereby to drive the pulley 101 clockwise. The rotation of the pulley 101 is transmitted to the gear 221 through the gear portion 101a which is in meshing engagement with the latter. The rotation of the gear 221 is transmitted to the operation cam means 210 through the gears 222, 223 and 224, so that the cam wheel 211 is rotated counter-clockwise. Consequently, the sub brakes 411 and 412 are actuated by the operation of the lever 414 engaging the cam groove 214 in the cam wheel 211 thereby to provide operations such as pressing of these brakes to the feeding reel base 10 and the take-up reel base 9 to prepare for the loading operation.

Figure 8:
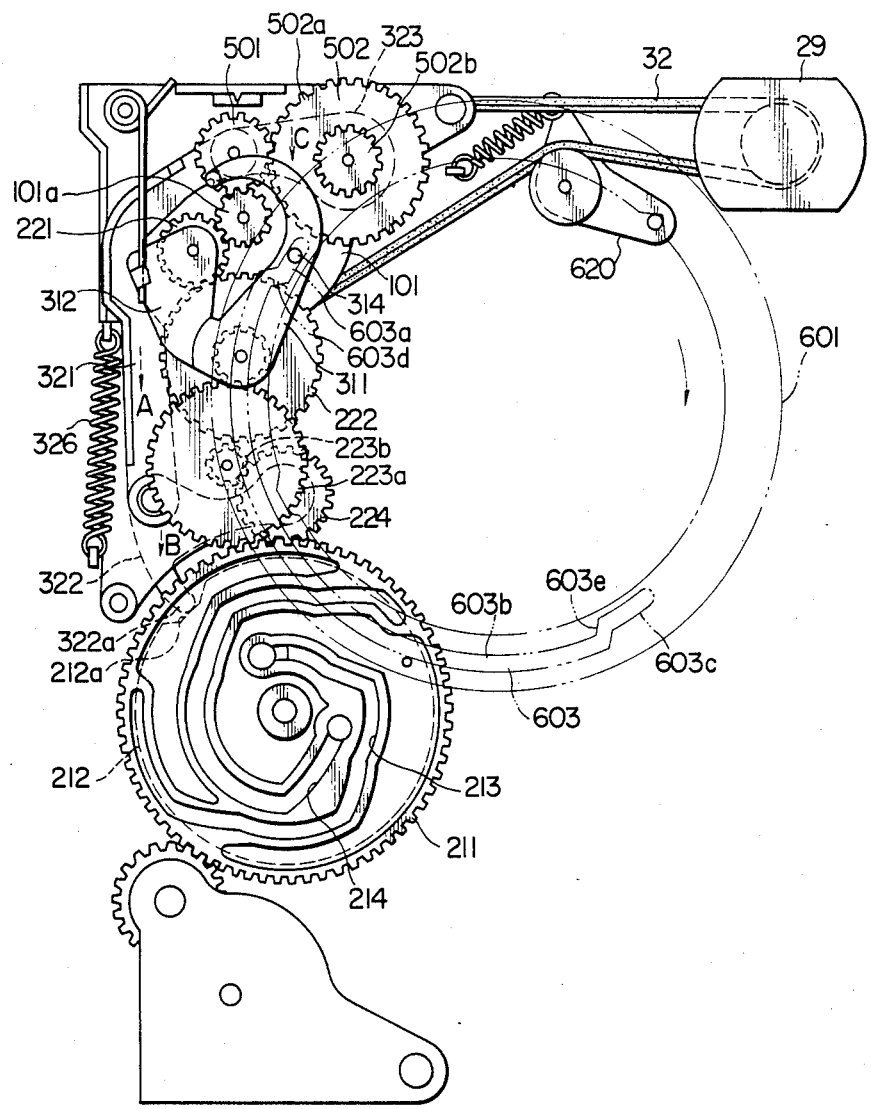
Figure 9:
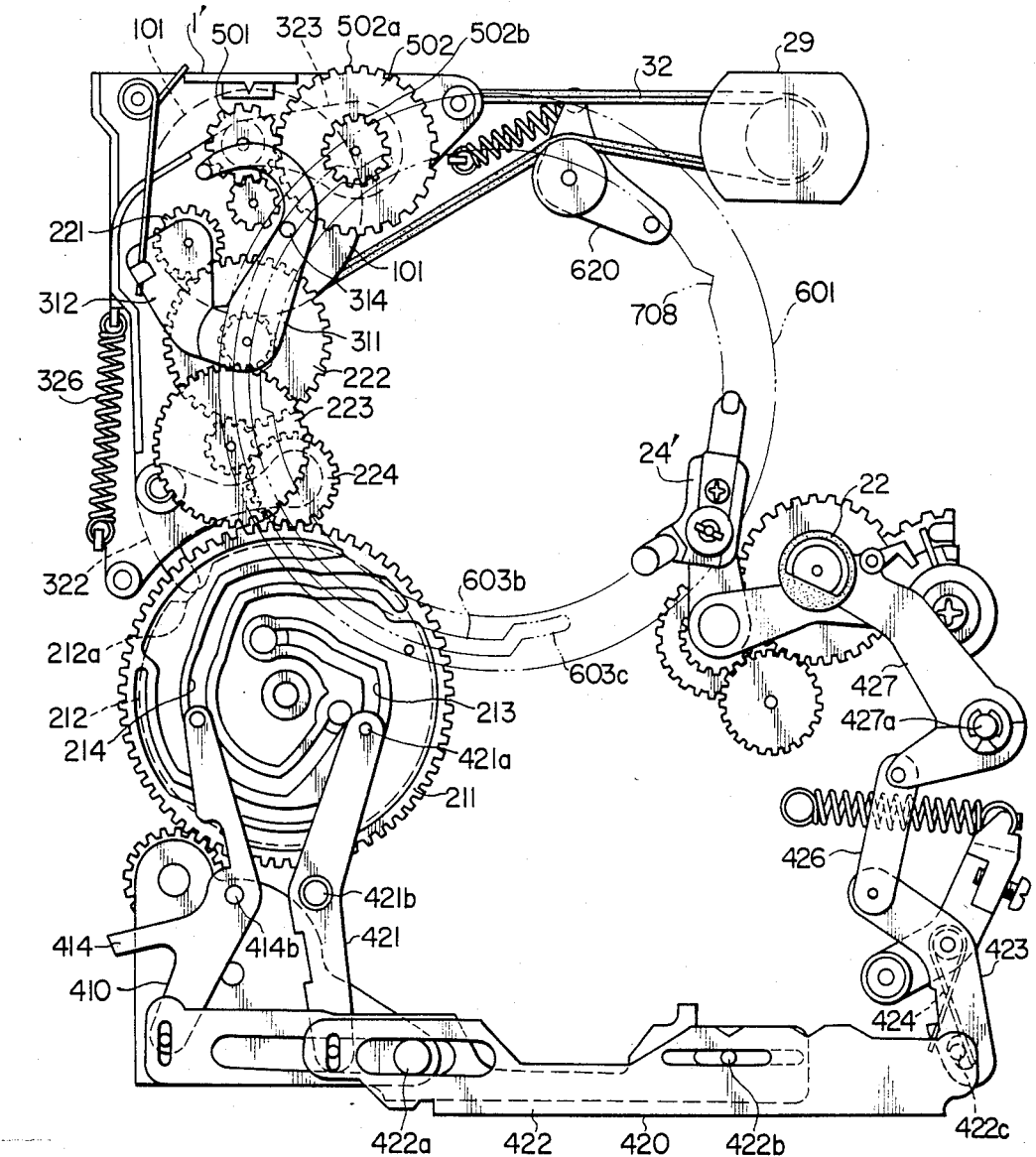

When the cam wheel 211 is further rotated until the projection 322a of the loading gear control lever 322 is at a position where it faces the recess 212a in the loading gear control cam 212, the lever 322 is moved in the direction of the arrow B shown in FIG. 8, with a resultant movement of the loading gear control levers 321 and 323 in the directions of arrows A and C, respectively. Consequently, the loading driving gear 501 under the control of these levers meshes with the gear portion 101a of the pulley 101. Therefore, the torque of the pulley 101 is transmitted through the gear portion 101a of the latter to both of the cam driving gear 221 and the loading driving gear 501. The rotation of the gear 502 is further transmitted through the gear portion 502a to the driving gear 102 which in turn drives through its gear portion 102a the gear portion 602 of the loading ring 601. Consequently, the loading ring 601 is rotated clockwise.

When the loading ring 601 has been rotated over a predetermined angle to bring the control pin 314 of the cam gear control lever means 310 from the guide groove 603a into the groove 603b in the ring 601, the cam gear control lever means 310 is rotated counter-clockwise by the torque from the loading ring 601. In consequence, the cam driving gear 221 which is under the control of the lever means 310 is moved away from the gear portion 101a of the pulley 101, so that the cam wheel 211 stops its rotation at the position shown in FIG. 9.

A further rotation of the loading ring 601 causes an upward movement of the upstream tape extracting member 24 and the tape guide 81 along the guiding groove 11a formed in the base plate 1 as well as an upward movement of the downstream tape extracting member 24' along the guiding groove 11b, so that the tape 42 extracted from the cassette 54 is wound in U-shape up around the cylinder 12 as known per se.

Figure 10:
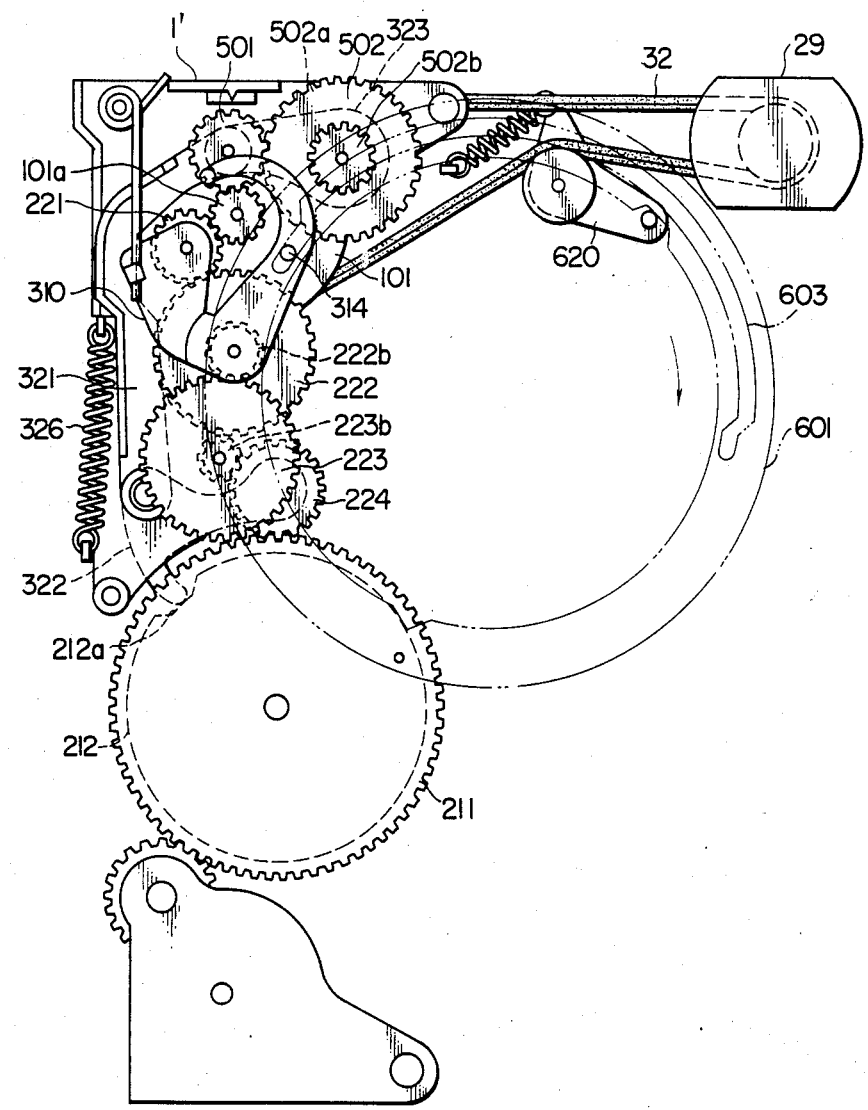
Figure 11:
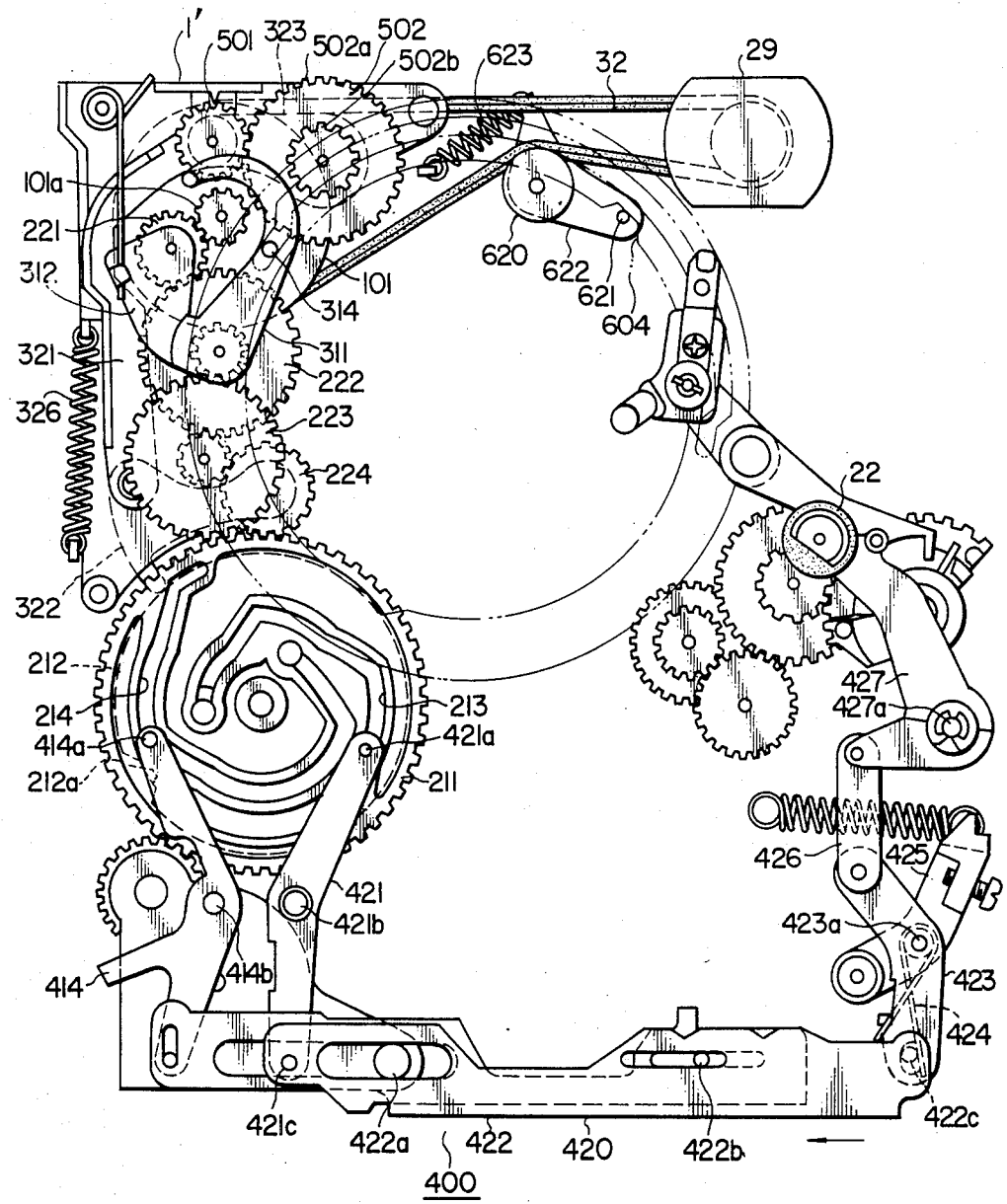

When the loading ring 601 has been rotated to a position where it almost completes the loading operation as shown in FIG. 10 and the tape extracting members 24 and 24' have reached the retainer members 41 and 41', the cam gear control lever means 310 is rotated clockwise while shifting its control pin 314 from the guide groove 603b to the guide groove 603c. This clockwise rotation of the lever means 310 brings the cam driving gear 221 again into engagement with the gear portion 101a of the pulley 101, so that the cam wheel 211 again starts rotation in the counter-clockwise direction. This counter-clockwise rotation of the cam wheel 211 causes the loading gear control cam 212 to push the loading gear control lever 322 upwardly, so that the levers 321 and 323 are moved upwardly. Consequently, the engagement between the gear portion 101a and the gear 501 is cancelled to complete the loading operation. Meanwhile, the pin 621 of a loading holding mechanism 620 is received by a notch 604 in the loading ring 601, so that the ring 601 is held in this position. In this state, the torque of the motor 29 is transmitted only to the cam wheel 211.

A further rotation of the cam wheel 211 actuates the brake mechanism 410 and the pinch roller pressing mechanism 420 which are operatively connected to the cam wheel 211. Namely, when the cam wheel 211 rotates, the cam lever 421 of the pinch roller pressing mechanism 420 is rotated clockwise around a fulcrum constituted by the shaft 421b, so that the slider 422 is slid in the direction of the arrow to cause a clockwise rotation of the lever 423 which in turn rotates the link 426 counter-clockwise, which is followed by a clockwise rotation of the pinch roller arm 427. Consequently, the pinch roller 22 is shifted from an unloading stop mode position shown in FIG. 6 through a loading mode position shown in FIG. 9 to a loading stop mode position shown in FIG. 11.

The rotation of the cam wheel also causes a rotation of the cam lever 414 of the braking mechanism 410 about a fulcrum constituted by the shaft 414b thereby to move the T-brake shown in FIG. 5 away from the take-up reel base 9 (forwarding or rewinding).

Figure 12:
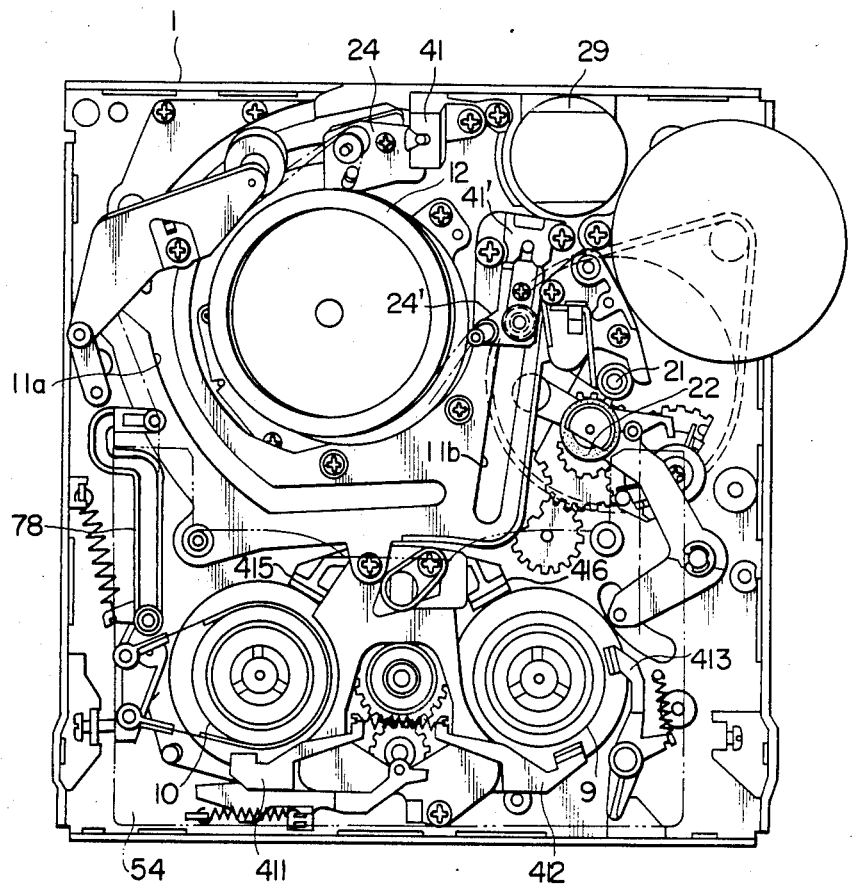

Meanwhile, the main brakes 415 and 416 are urged against the reel bases 10 and 9 while the sub-brakes 411 and 412 are moved away from the reel bases 10 and 9, whereby the loading stop mode (see FIGS. 11 and 12) is prepared. The power supply to the motor 29 is then stopped. This can be done by sensing the loading stop mode by a mode sensing switch (not shown) which emits an output signal for interrupting the power supply to the motor 29 by the output signal of this switch.

Figure 13:
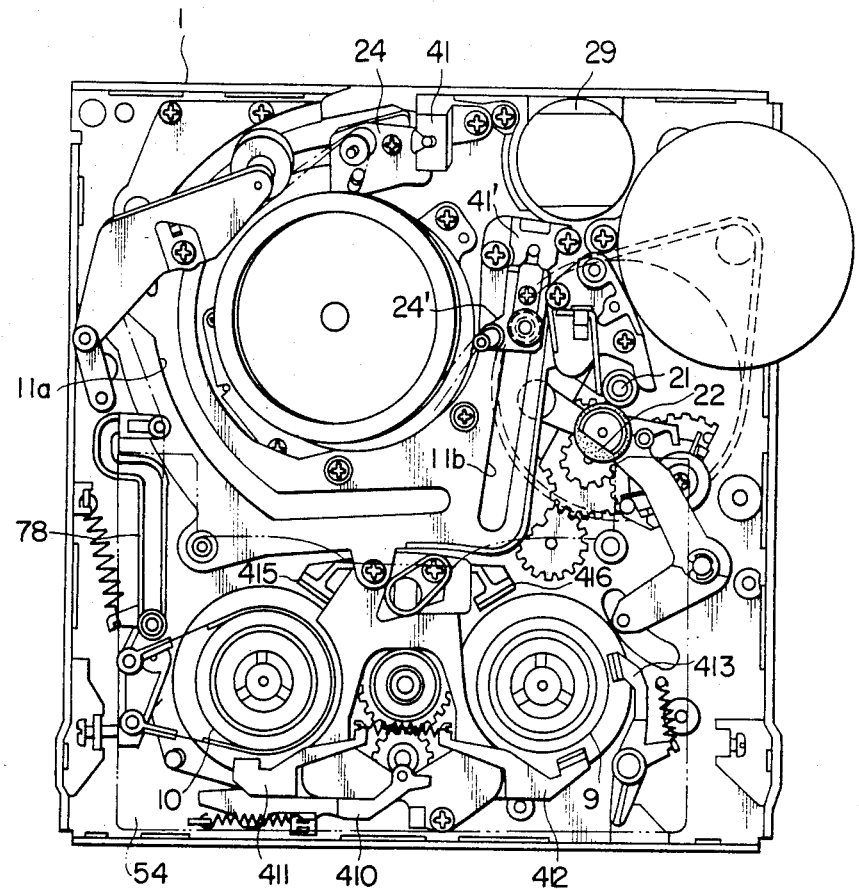

When the apparatus is in the loading stop mode as discussed above and when a recording button (not shown), for example, is pressed to commence again the power supply to the motor 29, the cam wheel 211 is further rotated counter-clockwise to release the main brakes 415 and 416 while pressing the tension arm 78 to the tape 42 and urging the pinch roller against the capstan 21. Then, a recording mode shown in FIG. 13 is attained by rotating the capstan 21 and the cylinder 12 in a manner known per se.

When a stop button (not shown) is pressed when the apparatus is in the recording or reproducing mode, unloading operation is carried out in accordance with a procedure which is reverse to that for the loading operation.

Figure 14:
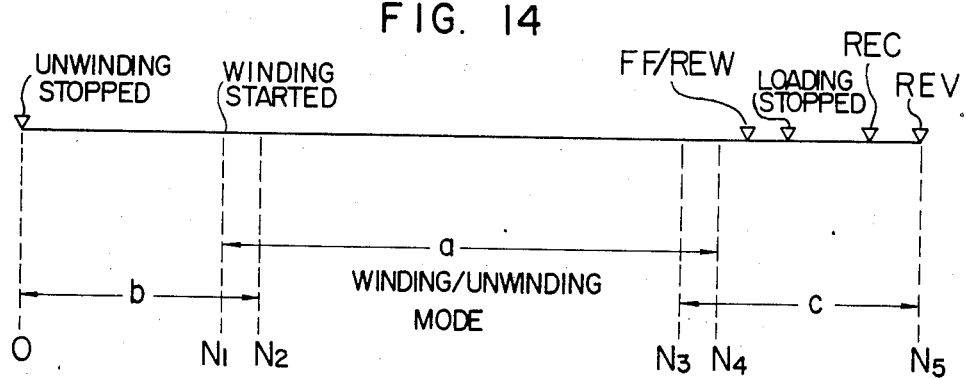
FIG. 14 is a time chart for diagrammatically illustrating the operation of the apparatus in accordance with the invention.

FIG. 14 diagrammatically shows the periods of rotation of the cam wheel 211 and the loading ring 601 which are driven by the loading motor 29. Symbols b and c represent the periods of rotation of the cam wheel 211. The braking mechanism 420 and the pinch roller mechanism 410 are driven within these periods. On the other hand, a symbol a represents the period of rotation of the loading ring 601, within which the loading mechanism 600 is driven to effect the loading or unloading. Symbols $N_1$ to $N_5$ represent the total number of revolutions of the loading motor 29. The period between $N_1$ and $N_2$ corresponds to the period in which the cam wheel 211 rotates to bring the idler gear 501 into engagement with the gear portion 101a of the pulley 101, while the period between $N_3$ and $N_4$ corresponds to the period in which the cam wheel 211 is rotated to disengage the idler gear 501 from the gear portion 101a.

As has been described, in the apparatus of the invention, a single motor is used as a common driving power source for both of the loading mechanism and the tape operation mechanism and the driving of the loading mechanism and the driving of the tape operation mechanisms are conducted separately from each other. It is, therefore, possible to obtain large angles of rotation of the operation cam for driving respective tape operation mechanisms and, accordingly, to facilitate a reliable detection of each mode without requiring any increase in the precision of the cam and other elements which form the tape operation mechanisms. In consequence, the present invention contributes greatly to an improvement in the stability and accuracy of operation of the tape operation mechanisms.

What is claimed is:

1. A magnetic recording and reproducing apparatus comprising:
   a motor;
   a first driving means adapted to be driven by the power of said motor;

a tape operation mechanism means including a tape pressing mechanism for urging a pinch roller against a capstan;

a tape loading mechanism;

a second driving means operable by the power of said first driving means to actuate said tape operation mechanism means;

a third driving means operable by the power of said first driving means to actuate said tape loading mechanism; and a driving power transmission change-over mechanism operative to control the transmission of the driving power of said first driving means to said tape loading mechanism and to said tape operation mechanism means and includind a first change-over means operatively connected to said tape loading mechanism and being responsive to operation modes of said tape loading mechanism to drivingly connect and disconnect said first driving means to and from said second driving means and a second change-over means operatively connected to said tape operation mechanism means and being responsive to operation modes of said tape operation mechanism means to drivingly connect and disconnect said first driving means to and from said third driving means, wherein said tape operation mechanism means includes an operation cam means, said second driving means comprises a first group of gears rotatable in response to the torque of said first driving means to drive said operation cam means of said tape operation mechanism means, and said third driving means comprises a second group of gears rotatable in response to the torque of said first driving means to drive said tape loading mechanism.

2. A magnetic recording and reproducing apparatus comprising:

a motor;

a first driving means adapted to be driven by the power of said motor;

a tape operation mechanism means including a tape pressing mechanism for urging a pinch roller against a capstan;

a tape loading mechanism;

a second driving means operable by the power of said first driving means to actuate said tape operation mechanism means;

a third driving means operable by the power of said first driving means to actuate said tape loading means; and a driving power transmission change-over mechaniam engaged with said second driving means and said tape loading mechanism and adapted to selectively transmit the power of said first driving means to said second driving means and said third driving means in accordance with a driving mode thereby to selectively drive said tape operation mechanism means and said tape loading mechanism;

wherein said second driving means includes a first group of gears adapted to be rotated by the torque of said first driving means and an operation cam adapted to be rotated by said first group of gears to drive said tape operation mechanism means; said third driving means includes a second group of gears adapted to be rotated by the torque of said first driving means to drive said tape loading means; said driving power transmission change-over mechanism comprises a first movable lever means connected to said tape loading means and normally operatively connecting said first group of gears of said second driving means to said first driving means but cancelling the connection between said first group of gears of said second driving means and said first driving means when said tape loading means is in one of loading and unloading positions, and a second movable lever means disconnecting the second group of gears of said third driving means from said first driving means but connecting said second group of gears of said third driving means to said first driving means when said tape loading means is in one of the loading and unloading positions; said operation cam having a cam portion engaged with said second movable lever means to drive said second movable lever means in two modes in one of which said third driving means is connected to said first driving means through said second movable lever means thereby to bring said tape loading means into the loading/unloading mode and in the other of which said second movable lever means disconnects said third driving means from said first driving means.

3. A magnetic recording and reproducing apparatus comprising:

a motor;

a first driving means adapted to be driven by the power of said motor;

a tape operation mechanism means including a tape pressing mechanism for urging a pinch roller against a capstan;

a tape loading mechanism;

a second driving means operable by the power of said first driving means to actuate said tape operation mechanism means;

a third driving means operable by the power of said first driving means to actuate said tape loading mechanism; and a driving power transmission change-over mechanism operative to control the transmission of the driving power of said first driving means to said tape loading mechanism and to said tape operation mechanism means and including a first change-over means operatively connected to said tape loading mechanism and being responsive to operation modes of said tape loading mechanism to drivingly connect and disconnect said first driving means to and from said second driving means and a second change-over means operatively connected to said tape operation mechanism means and being responsive to operation modes of said tape operation mechanism means to drivingly connect and disconnect said first driving means to and from said third driving means, wherein:

said first driving means comprises a driving mechanism including a pulley rotatable by said motor and a gear member rotatable with said pulley;

said tape operation mechanism means includes an operation cam means;

said second driving means comprises a first group of gears adapted to be rotated by the torque of said gear member of said first driving means to drive said operation cam means of said tape operation mechanism;

said tape loading mechanism includes a loading ring;

said third driving means comprises a second group of gears adapted to be rotated by the torque of said gear member of said first driving means to drive said loading ring;

said first change-over means of said driving power transmission change-over mechanism comprises a first movable member engaged with said loading ring and being movable by the rotation thereof to operatively connect said first group of gears to said gear member of said first driving means when the apparatus is in operation other than a loading mode operation and to disconnect said first group of gears from said gear member of said first driving means when the apparatus is in a loading mode operation, said second change-over means of said change-over mechanism comprising a second movable member engaged with said operation cam means and being movable by the rotation thereof to operatively connect said second group of gears of said third driving means to said gear member of said first driving means only when the apparatus is in a loading mode operation, whereby, when the apparatus is in an operation other than the loading mode operation the torque of said first driving means is transmitted to said first group of gears of said second driving means which in turn drives said tape operation mechanism means;

when said tape operation mechanism means is brought into a loading mode operation, said second group of gears of said third driving means is operatively connected to said first driving means to start driving of said tape loading mechanism, rotation of said loading ring being operative to disconnect said first group of gears of said second driving means from said gear member of said first driving means so that the torque of said first driving means is transmitted only to said loading ring;

immediately before the tape loading operation is completed, said first group of second driving means is operatively connected to said gear member of said first driving means so that the rotation of said first driving means is transmitted to said second driving means to again drive said tape operation mechanism means; and when said tape operation mechanism means is driven over a predetermined angular range, said second movable member is driven to disconnect said second group of gears under the control thereof from said first driving means to that the torque of said first driving means is transmitted only to said tape operation mechanism means.

4. A magnetic recording and reproducing apparatus comprising:
a motor;
a first driving means adapted to be driven by the power of said motor;
a tape operation mechanism means including an operation cam means and a tape pressing mechanism operatively associated with the rotation of said operation cam means to urge a pinch roller against a capstan;
a tape loading means;
a second driving means operable by the power of said first driving means to actuate said operation cam means of said tape operation mechanism means;
a third driving means operable by the power of said first driving means to actuate said tape loading means; and
a driving power transmission change-over mechanism operative to control the transmission of the driving power of said first driving means to said tape laoding means and to said tape operation mechanism means, said driving power transmission change-over mechanism being oepratively connected to said tape loading means and responsive to operation modes of said tape loading means to mechanically connect and disconnect said first driving means to and from said second driving means, and also being operatively connected to said tape operation mechanism means and responsive to operation modes of said tape operation mechanism means to mechanically connect and disconnect said first driving means to and from said third driving means;
said driving power transmission change-over mechanism comprising first means engaged with said tape loading means and being movable by the rotation thereof to operatively connect said second driving means to said first driving means when the apparatus is in an operation other than a loading mode operation and to mechanically cancel the connection when the apparatus is in a loading mode operation, and second means engaged with said operation cam means of said tape operation mechanism means and being movable by the rotation of said operation cam means to operatively connect said third driving means to said first driving means only when the apparatus is in a loading mode operation, whereby;
(1) when the apparatus is in an operation other than the loading mode operation, the torque of said first driving means is transmitted to said second driving means which in turn drives said operation cam means of said tape operation mechanism means;
(2) when said tape operation mechanism means is brought into a loading operation, said third driving means is operatively connected to said first driving means to start operation of said tape laoding means, the operation of said tape loading means being operative to mechanically cancel the connection between said second driving means and said first driving means to stop the operation of said operation cam means so that the torque of said first driving means is transmitted only to said tape loading means;
(3) immediately before the tape loading operation is completed, said second driving means is operatively connected to said first driving means so that the rotation of said first driving means is transmitted to said second driving means to again drive said operation cam means of said tape operation mechanism means; and
(4) when said operation cam means of said tape operation mechanism means is driven over a predetermined angular range, said second driving means is driven to mechanically cancel the connection between said second means of said driving power transmission change-over mechanism and said first driving means so that the torque of said first driving means is transmitted only to said tape operation mechanism means.

* * * * *